United States Patent
Lee et al.

(10) Patent No.: US 10,504,475 B2
(45) Date of Patent: Dec. 10, 2019

(54) POWER SUPPLY DEVICE AND DISPLAY DEVICE INCLUDING THE SAME

(71) Applicant: SAMSUNG DISPLAY CO., LTD., Yongin-si, Gyeonggi-do (KR)

(72) Inventors: Dae-sik Lee, Hwaseong-si (KR); Jongjae Lee, Hwaseong-si (KR); Sujin Kim, Ulsan (KR); Yanguk Nam, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 201 days.

(21) Appl. No.: 15/495,057

(22) Filed: Apr. 24, 2017

(65) Prior Publication Data

US 2017/0309246 A1 Oct. 26, 2017

(30) Foreign Application Priority Data

Apr. 25, 2016 (KR) ........................ 10-2016-0050330

(51) Int. Cl.
*G09G 3/36* (2006.01)
*H02M 1/08* (2006.01)
(Continued)

(52) U.S. Cl.
CPC ......... *G09G 3/3696* (2013.01); *G09G 3/3677* (2013.01); *G09G 3/3688* (2013.01);
(Continued)

(58) Field of Classification Search
CPC ............ H05B 33/0815; H05B 33/0827; H05B 33/0818; H05B 33/086; H05B 33/083; H05B 33/0848; H05B 33/0851; H05B 37/02; H05B 33/0812; H05B 33/0845; H05B 33/0887; H05B 33/0821;
(Continued)

(56) References Cited

U.S. PATENT DOCUMENTS 9,048,686 B2 6/2015 Yamadaya
2011/0248648 A1* 10/2011 Liu ...................... G09G 3/3406
315/294
(Continued)

FOREIGN PATENT DOCUMENTS

KR 10-2011-0089063 8/2011
KR 10-2012-0017347 2/2012

*Primary Examiner* — Wei (Victor) Y Chan
(74) *Attorney, Agent, or Firm* — Lewis Roca Rothgerber Christie LLP

(57) ABSTRACT

A power supply device includes n power supply circuits connected in parallel and a controller to control a number of the operating power supply. The controller includes n detectors, a comparator, and an on/off controller. The n detectors are respectively connected to the n power supply circuits. The n detectors receive feedback current from the number of operating power supply circuits. The comparator compares the feedback current with predetermined first and second reference currents and outputs first, second, and third state signals. The on/off controller determines the number of the operating power supply circuits according to a cumulative number of each of the first to third state signals during a predetermined window section, and controls a on/off state of the power supply circuits according to the determined number.

16 Claims, 12 Drawing Sheets

(51) Int. Cl.
*H02M 3/158* (2006.01)
*H02M 1/00* (2006.01)

(52) U.S. Cl.
CPC ............. *H02M 1/08* (2013.01); *H02M 3/158* (2013.01); *H02M 3/1584* (2013.01); *G09G 2330/021* (2013.01); *H02M 2001/0009* (2013.01)

(58) Field of Classification Search
CPC ............ H05B 33/0824; H05B 33/0842; H05B 33/089; H05B 33/0896; H05B 33/02; H05B 33/0806; H05B 33/0854; H05B 33/0866; H05B 33/0893; H05B 33/22; H05B 33/28; H05B 37/0281; H05B 37/036
USPC .................. 315/297, 192, 186, 122, 307
See application file for complete search history.

(56) References Cited

U.S. PATENT DOCUMENTS

| | | | |
|---|---|---|---|
| 2014/0192102 A1* | 7/2014 | Im ..................... | H05B 33/0827 345/691 |
| 2015/0076999 A1* | 3/2015 | Malinin ............. | H05B 33/0815 315/186 |

* cited by examiner

POWER SUPPLY DEVICE AND DISPLAY DEVICE INCLUDING THE SAME

CROSS-REFERENCE TO RELATED APPLICATION

Korean Patent Application No. 10-2016-0050330, filed on Apr. 25, 2016, and entitled, "Power Supply Device and Display Device Including the Same," is incorporated by reference herein in its entirety.

BACKGROUND

1. Field

One or more embodiments described herein relate to a power supply device and a display device including a power supply device.

2. Description of the Related Art

A display device includes a driving circuit for driving a display panel. The display panel includes a liquid crystal layer between substrates including pixel and common electrodes. When a voltage is applied to the pixel electrode and the common electrode, an electric field is generated that controls the orientation of liquid crystal molecules in the liquid crystal layer and the polarization of incident light. As a result, an image is displayed. The display device includes a power supply device to generate a voltage for operating the driving circuit and a voltage for generating a driving signal to drive the display panel.

SUMMARY

In accordance with one or more embodiments a power supply device includes n power supply circuits connected in parallel, where n is a natural number of 2 or more; and a controller to control a number of operating power supply circuits among the n power supply circuits, wherein the controller includes: n detectors respectively connected to the n power supply circuits, the n detectors to receive a feedback current from the number of operating power supply circuits among the n power supply circuits; a comparator to compare the feedback current with predetermined first and second reference currents and output first, second, and third state signals; and an on/off controller to determine the number of the operating power supply circuits according to a cumulative number of each of the first to third state signals during a predetermined window section and to control on/off of the power supply circuits according to the determined number.

Each of the n detectors may receive the feedback current from a corresponding power supply circuit, during a high section of a switching signal, to control operation of the corresponding power supply circuit, and the comparator may calculate an average current of a predetermined unit section based on the feedback current. The window section may include a plurality of unit sections, the window section may determine a state of each of the unit sections as one of the first to third state signals and determine the number of the operating power supply circuits according to the cumulative number of each of the first to third state signals accumulated during the window section.

The first state signal may occur when the average current is greater than the first and second reference currents; the second state signal may occur when the average current is between the first and second reference currents; and the third state signal may occur when the average current is less than the first and second reference currents. When the number of the first state signals accumulated during the window section is largest, the number of the operating power supply circuits may be increased; when the number of the second state signals accumulated during the window section is largest, the number of the operating power supply circuits may not change; and when the number of the third state signals accumulated during the window section is largest, the number of the operating power supply circuits may be decreased. When the cumulative numbers of at least two signals of the first to third state signals are equal, priority may be given in order of the first, second, and third state signals.

The controller may include an overcurrent protector to compare the feedback current to a predetermined third reference current and to turn off the operating power supply circuit when the feedback current is greater than the third reference current. A magnitude of the third reference current may be set according to the number of the operating power supply circuits. An operation period of the overcurrent protector may be less than the unit section.

In accordance with one or more other embodiments, a display device includes a display panel to display an image; a driver to drive the display panel; and a power supply to supply a driving voltage to the driver, wherein the power supply includes: n power supply circuits connected in parallel, where n is a natural number of 2 or more, and a controller to control a number of operating power supply circuits among the n power supply circuits, wherein the controller includes: n detectors respectively connected to the n power supply circuits, the n detectors to receive a feedback current from the number of operating power supply circuits among the n power supply circuits; a comparator to compare the feedback current with predetermined first and second reference currents to output first, second, and third state signals; and an on/off controller to determine the number of the operating power supply circuits according to the cumulative number of each of the first to third state signals during a predetermined window section and to control an on/off of the power supply circuits according to the determined number.

Each of the n detectors may receive the feedback current from a corresponding power supply circuit, during a high section of a switching signal, to control operation of the corresponding power supply circuit, and the comparator may calculate an average current of a predetermined unit section based on the feedback current. The unit section may correspond to one frame section where the display panel displays an image. The driver may include a data driver to supply a data signal to the display panel; and a gate driver to supply a gate signal to the display panel, and wherein the comparator may generate a prediction signal to set the unit section based on a vertical start signal to start operation of the gate driver.

The prediction signal may include an active section where the data driver is to operate and a blank section where the data driver is not to operate; and the on/off controller may change an on/off state of the power supply circuits during the blank section. The window section may include a plurality of unit sections, the window section may determine a state of each of the unit sections as one of the first to third state signals, and may determine the number of operating power supply circuits according to the cumulative number of each of the first to third state signals accumulated during the window section.

The first state signal may occur when the average current is greater than the first and second reference currents; the second state signal may occur when the average current is between the first and second reference currents; and the third state signal may occur when the average current is less than the first and second reference currents.

When a number of the first state signals accumulated during the window section is largest, the number of the operating power supply circuits may be increased; when a number of the second state signals accumulated during the window section is largest, the number of the operating power supply circuits may not be changed; and when a number of the third state signals accumulated during the window section is the largest, the number of the operating power supply circuits may be decreased. When the cumulative numbers of at least two signals of the first to third state signals are equal, priority may be given in an order of the first, second, and third state signals.

The controller may include an overcurrent protector to compare the feedback current with a predetermined third reference current and to turn off the operating power supply circuit when the feedback current is greater than the third reference current. A magnitude of the third reference current may be set according to the number of the operating power supply circuits.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
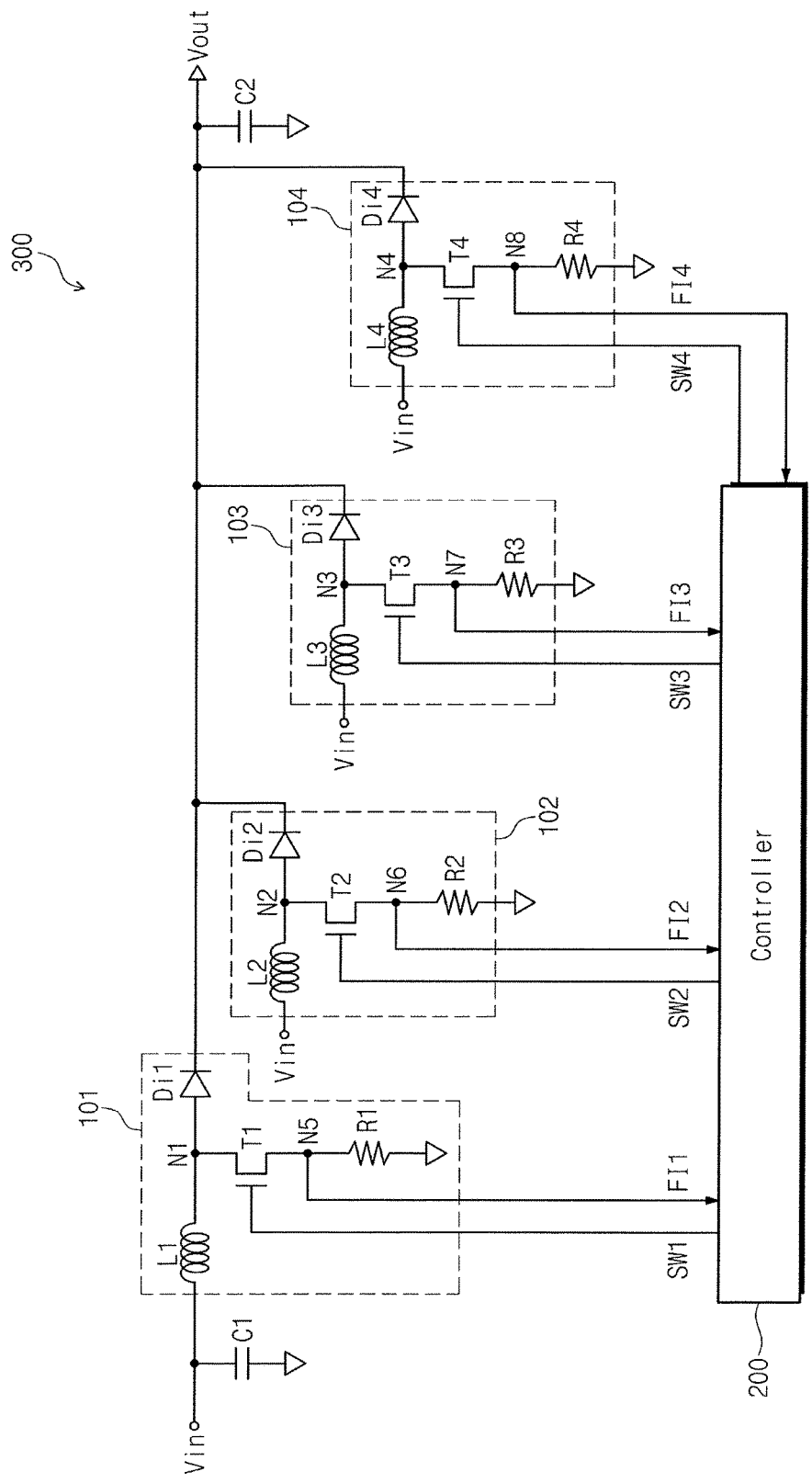
FIG. 1 illustrates an embodiment of a power supply device.

Example embodiments will be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments, or certain aspects thereof, may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
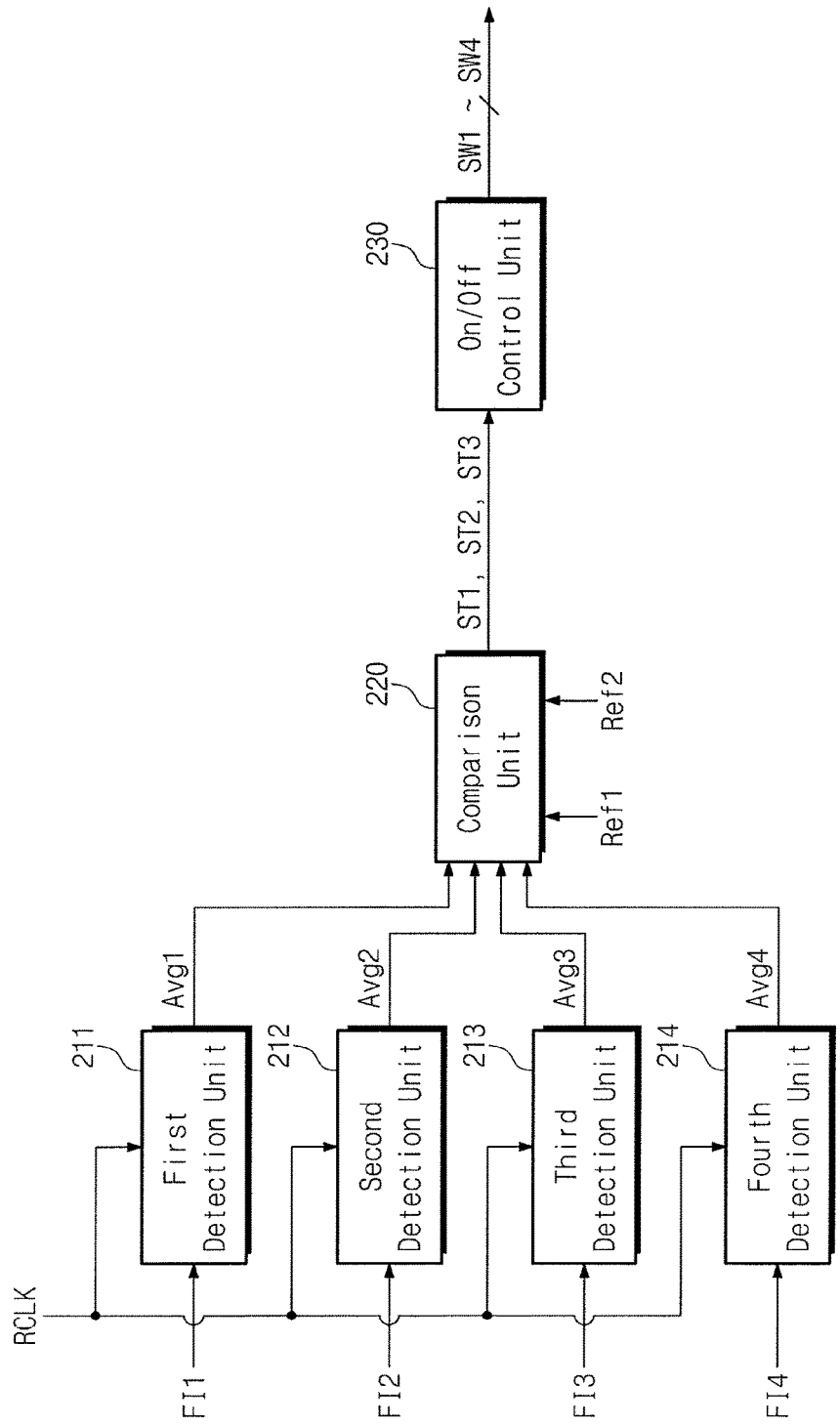
FIG. 2 illustrates an embodiment of a controller.

FIG. 1 illustrates an embodiment of a power supply device 300, and FIG. 2 illustrates an embodiment of a controller 200 in FIG. 1. Referring to FIG. 1, the power supply 300 includes first to fourth power supply circuits 101, 102, 103, and 104 connected in parallel. In one embodiment, the power supply device 300 may include n power supply circuits connected in parallel, where n is a natural number of 2 or more.

The power supply device 300 includes a controller 200 for controlling the number of turned-on power supply circuits (operating power supply circuits) among the first to fourth power supply circuits 101, 102, 103 and 104. The controller 200 includes first to fourth detection units 211, 212, 213, and 214, a comparison unit 220, and an on/off control unit 230. The first to fourth detection units 211, 212, 213, and 214 are connected to the first to fourth power supply circuits 101 to 104, respectively, and detect currents of the operation power supply circuits during a predetermined unit section in the first to fourth power supply circuits 101 to 104, 102, 103, and 104.

First to fourth detection units 211, 212, 213 and 214 respectively connected to the first to fourth power supply circuits 101, 102, 103 and 104 in FIG. 2. The number of detection units in the controller 200 and the number of the power supply circuits may be different in another embodiment.

The comparison unit 220 receives currents detected by the first to fourth detection units 211, 212, 213, and 214 and compares the detected currents with predetermined first and second reference currents Ref1 and Ref2 to output first, second, and third state signals ST1, ST2, and ST3.

The on/off control unit 230 determines the number of operating power supply circuits based on the first to third state signals ST1, ST2, and ST3 and controls the on/off of the first to fourth power supply circuits 101, 102, 103, and 104 according to the determined number of the operating power supply circuits.

Referring again to FIG. 1, the first to fourth power supply circuits 101, 102, 103, and 104 receive an input voltage Vin through an input terminal and boost the input voltage Vin to output an output voltage Vout through an output terminal.

The first power supply circuit 101 may include a first coil L1, a first transistor T1, a first diode Di1, and a first resistor R1. The first coil L1 has one end connected to the input terminal where the input voltage Vin is input and another end connected to a first node N1. The first diode Di1 includes an anode connected to the first node N1 and a cathode connected to the output terminal where the output voltage Vout is output. The first transistor T1 includes a gate for receiving the first switching signal SW1 from the controller 200, a drain connected to the first node N1, and a source connected to the ground terminal through the first resistor R1.

A first capacitor C1 is connected between the input terminal and the ground terminal. A second capacitor C2 is connected between the output terminal and the ground terminal.

The on/off of the first transistor T1 is adjusted according to the signal level of the first switching signal SW1 output from the controller 200. The first transistor T1 is turned off when the first switching signal SW1 is in a low level and a first current I1 flowing through the first coil L1 is gradually increased in proportion to the input voltage Vin applied to ends of the first coil L1 according to current and voltage characteristics of the first coil L1. When the first switching signal SW1 is in a high level, the first transistor T1 is turned on and the first current I1 flowing through the first coil L1 flows through the first diode D1.

The second power supply circuit 102 may include a second coil L2, a second transistor T2, a second diode Di2, and a second resistor R2. The second coil L2 has one end connected to the input terminal and another end connected to a second node N2. The second diode Di2 includes an anode connected to the second node N2 and a cathode connected to the output terminal. The second transistor T2 includes a gate for receiving the second switching signal SW2 from the controller 200, a drain connected to the second node N2, and a source connected to the ground terminal through the second resistor R2.

The second transistor T2 is turned off when the second switching signal SW2 is in a low level and a second current I2 flowing through the second coil L2 is gradually increased in proportion to the input voltage Vin applied to the both ends of the second coil L2 according to the current and voltage characteristics of the second coil L2. When the second switching signal SW2 is in a high level, the second transistor T2 is turned on and the second current I2 flowing through the second coil L2 flows through the second diode D2.

The third power supply circuit 103 may include a third coil L3, a third transistor T3, a third diode Di3, and a third resistor R3, and the fourth power supply circuit 104 may include a fourth coil L4, a fourth transistor T4, a fourth diode Di4, and a fourth resistor R4.

The third coil L3 has one end connected to the input terminal and another end of the third coil L3 connected to a third node N3. The third diode Di3 includes an anode connected to the third node N3 and a cathode connected to the output terminal. The third transistor T3 includes a gate for receiving the third switching signal SW3 from the controller 200, a drain connected to the third node N3, and a source connected to the ground terminal through the third resistor R3.

When the third switching signal SW3 is in a low level, the third transistor T3 is turned off and the third current I3 flowing through the third coil L3 is increased gradually. When the third switching signal SW3 is in a high level, the third transistor T3 is turned on and the third current I3 flowing through the third coil L3 flows through the third diode D3.

The fourth coil L4 has one end connected to the input terminal and another end of the fourth coil L4 connected to a fourth node N4. The fourth diode Di4 includes an anode connected to the fourth node N4 and a cathode connected to the output terminal. The fourth transistor T4 includes a gate for receiving the fourth switching signal SW4 from the controller 200, a drain connected to the fourth node N4, and a source connected to the ground terminal through the fourth resistor R4.

When the fourth switching signal SW4 is in a low level, the fourth transistor T4 is turned off and the fourth current I4 flowing through the fourth coil L4 is increased gradually. When the fourth switching signal SW4 is in a high level, the fourth transistor T4 is turned on and the fourth current I4 flowing through the fourth coil L4 flows through the fourth diode D4.

A voltage is charged to the second capacitor C2 according to the current and voltage characteristics of the second capacitor C2. Therefore, the input voltage Vin is boosted to a predetermined voltage and output as the output voltage Vout.

The controller 200 controls at least one of the first to fourth power supply circuits 101, 102, 103 and 104 to operate in order to boost the input voltage Vin to the output voltage Vout.

The controller 200 receives current feedback from the first to fourth power supply circuits 101, 102, 103 and 104 to adjust the number of operating power supply circuits. For example, the first detection unit 211 is connected to the fifth node N5 of the first power supply circuit 101 and receives current feedback during operation of the first power supply circuit 101. The second detection unit 212 is connected to a sixth node N6 of the second power supply circuit 102 and receives a current feedback during operation of the second power supply circuit 102. Current fed back to the first detection unit 211 corresponds to first feedback current FI1, and current fed back to the second detection unit 212 corresponds to second feedback current FI2.

The third detection unit 213 is connected to a seventh node N7 of the third power supply circuit 103 and receives a current feedback during an operation of the third power supply circuit 103. The fourth detection unit 214 is connected to an eighth node N8 of the fourth power supply circuit 104 and receives a current feedback during an operation of the fourth power supply circuit 104. Current fed back to the third detection unit 213 corresponds to as third feedback current FI3, and current fed back to the fourth detection unit 214 corresponds to as fourth feedback current FI4.

The first detection unit 211 detects the magnitude of the first feedback current FI1 based on a reference clock RCLK and outputs a first average current Avg1 in a predetermined section based on the detected current. The second to fourth detection units 212, 213, and 214 also detect magnitudes of the second, third, and fourth feedback currents FI2, FI3, and FI4, respectively, based on the reference clock RCLK, and generate second, third, and fourth average currents Avg2, Avg3, and Avg4, respectively, in a predetermined section based on the detected current. The predetermined second may be one unit section. In one embodiment, a plurality of unit sections may be provided to define one window section.

The comparison unit 220 calculates the total average current based on the average current supplied from at least one of the first to fourth detection units 211, 212, 213, and 214, and compares the total average current with predetermined first and second reference currents Ref1 and Ref2. For example, when the total average current is greater than the first and second reference currents Ref1 and Ref2, the comparison unit 220 outputs the first state signal ST1. When the total average current has a value between the first and second reference currents Ref1 and Ref2, the comparison unit 220 outputs the second state signal ST2. In addition, when the total average current is less than the first and second reference currents Ref1 and Ref2, the comparison unit 220 outputs the third state signal ST3. For example, the comparison unit 220 determines the states of the unit sections as one of the first to third state signals ST1, ST2, and ST3 and transmits information indicative of the states to the on/off control unit 230.

The on/off control unit 230 sets the window section including the unit sections and determines an increase or decrease in the number of the operating power supply circuits according to the number of each of the first to third state signals ST1, ST2, and ST3 accumulated during the window section. When the number of the operating power supply circuits is increased, the on/off control unit 230 supplies a corresponding switching signal to power supply circuits other than the currently-operating power supply circuit, and operates them. When the number of operating power supply circuits is reduced (e.g., lower than a predetermined threshold), the on/off control unit 230 cuts off the supply of a corresponding switching signal to one of currently-operating power supply circuits and stops operation.

When the number of the first state signals ST1 is the largest among the number of each of the first to third state signals ST1, ST2, and ST3 accumulated during the window section, the number of the operating power supply circuits is increased. When the number of the third state signals ST3 is the largest, the number of operating power supply circuits is reduced. When the number of the second state signals ST2 is the largest, the existing number is maintained without increasing or decreasing the number of the operating power supply circuits.

It may be the case that the numbers of at least two state signals are the same among the number of each of the first to third state signals ST1, ST2, and ST3 accumulated during the window section. However, the on/off control unit 230 assigns a priority in the order of the first, second, and third state signals ST1, ST2, and ST3 among the first to third state signals ST1, ST2, and ST3. For example, when the cumulative numbers of the first and second state signals ST1, and ST2 are the same and greater than the cumulative number of the third state signals ST3, the number of the operating power supply circuits is increased according to the first state signal ST1.

When the cumulative numbers of the second and third state signals ST2 and ST3 are the same and greater than the cumulative number of the first state signals ST1, the number of the operating power supply circuits is not changed and maintained according to the second state signal ST2.

When the cumulative numbers of the first and third state signals ST1 and ST3 are the same and greater than the cumulative number of the second state signals ST2, the number of the operating power supply circuits may be increased according to the first state signal ST1.

Figure 3:
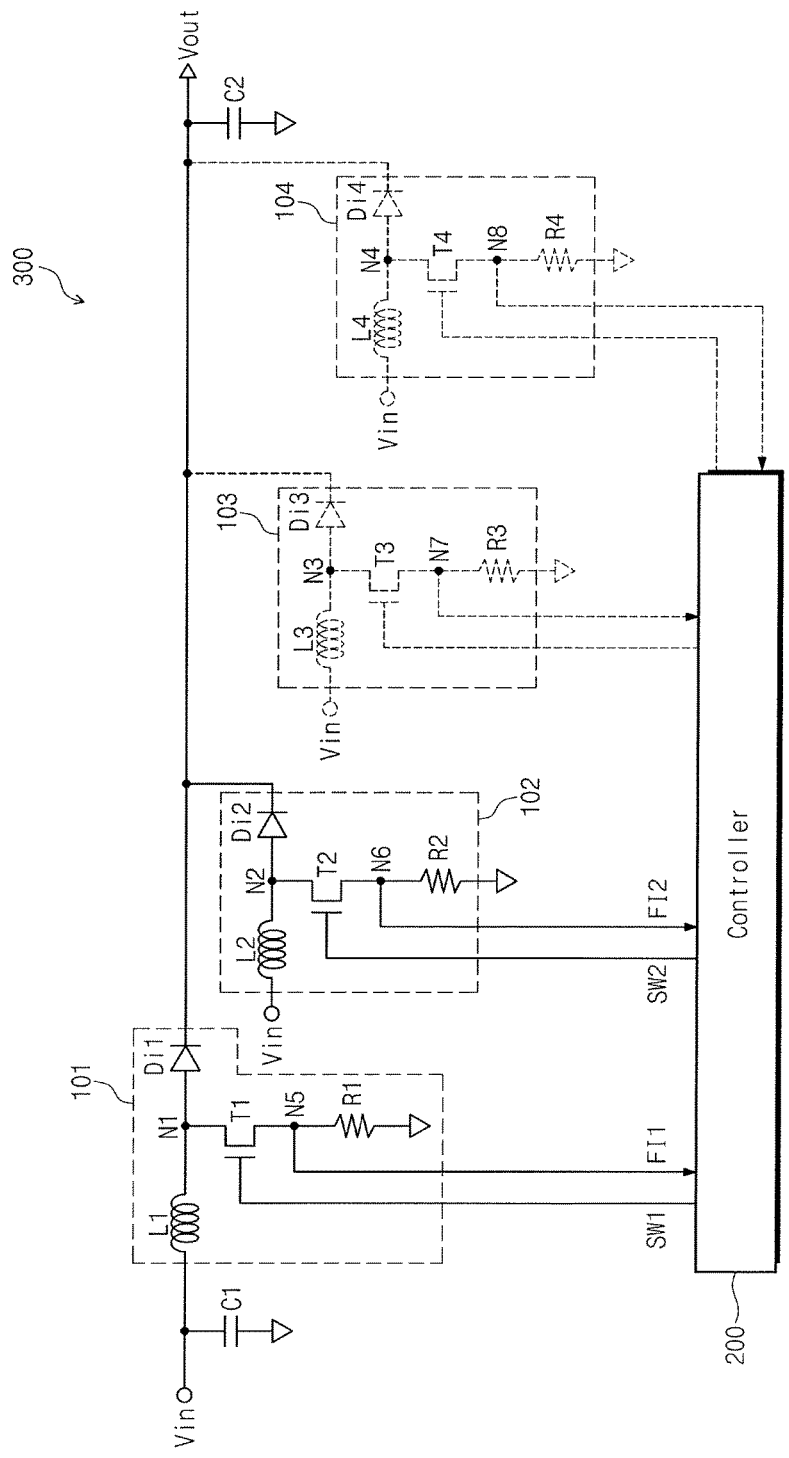
FIG. 3 illustrates a state in which first and second power supply circuits are in operation in the power supply device according to one embodiment.

FIG. 3 illustrates an embodiment of a state in which the first and second power supply circuits operate and the third and fourth power supply circuits stop.

Referring to FIG. 3, when the power supply device 300 operates using the first and second power supply circuits 101 and 102 (e.g., two power supply circuits), an operating power supply circuit becomes the first and second power supply circuits 101 and 102 and a non-operating power supply circuit becomes the third and fourth power supply circuits 103 and 104.

The controller 200 supplies the first and second switching signals SW1 and SW2 to the first and second power supply circuits 101 and 102, respectively, to turn them on. The third and fourth switching signals SW3 and SW4 (e.g., see FIG. 1) are not supplied to the third and fourth switches 103 and 104, thereby stopping their operation.

The controller 200 receives the first and second feedback currents FI1 and FI2 from the first and second power supply circuits 101 and 102 in operation, and does not receive the third and fourth feedback currents FI3 and FI4 (e.g., see FIG. 1) from the third and fourth power supply circuits 103 and 104 in non-operation.

The controller 200 calculates the cumulative number of each of the first to third state signals ST1, ST2, and ST3 during the window section based on the first and second feedback currents FI1 and FI2. Based on the cumulative number, a determination is made on whether to increase, decrease, or maintain the number of operating power supply circuits.

Figure 4:
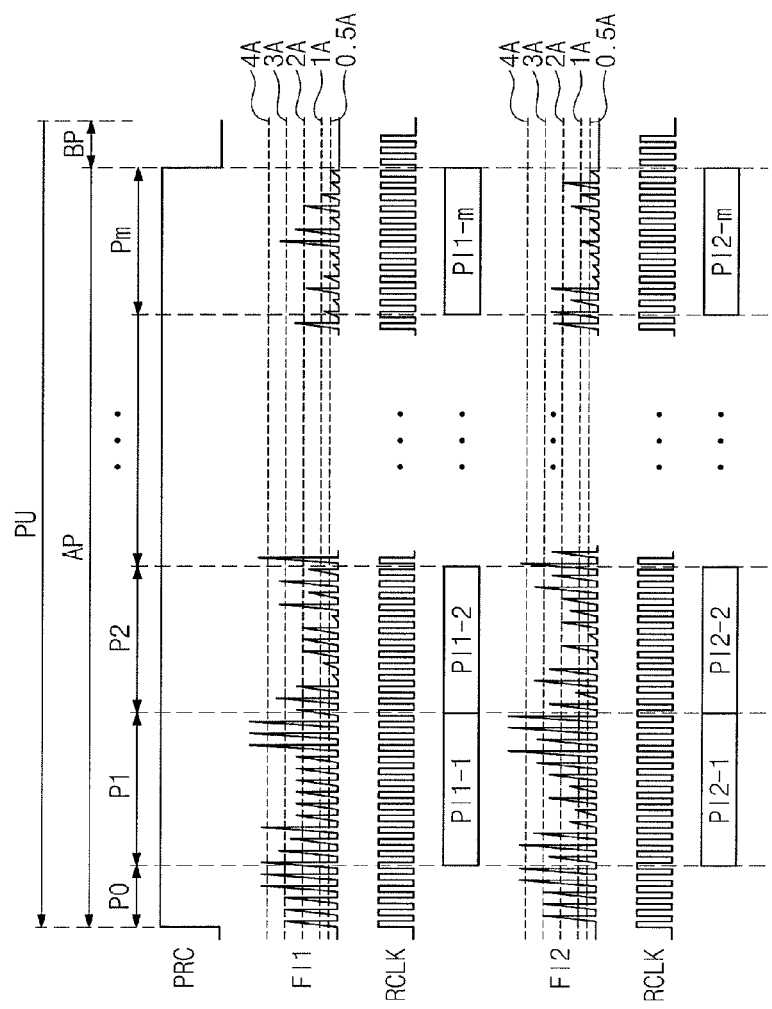
FIG. 4 illustrates a first feedback current and a second feedback current during a unit section according to one embodiment.
Figure 5:
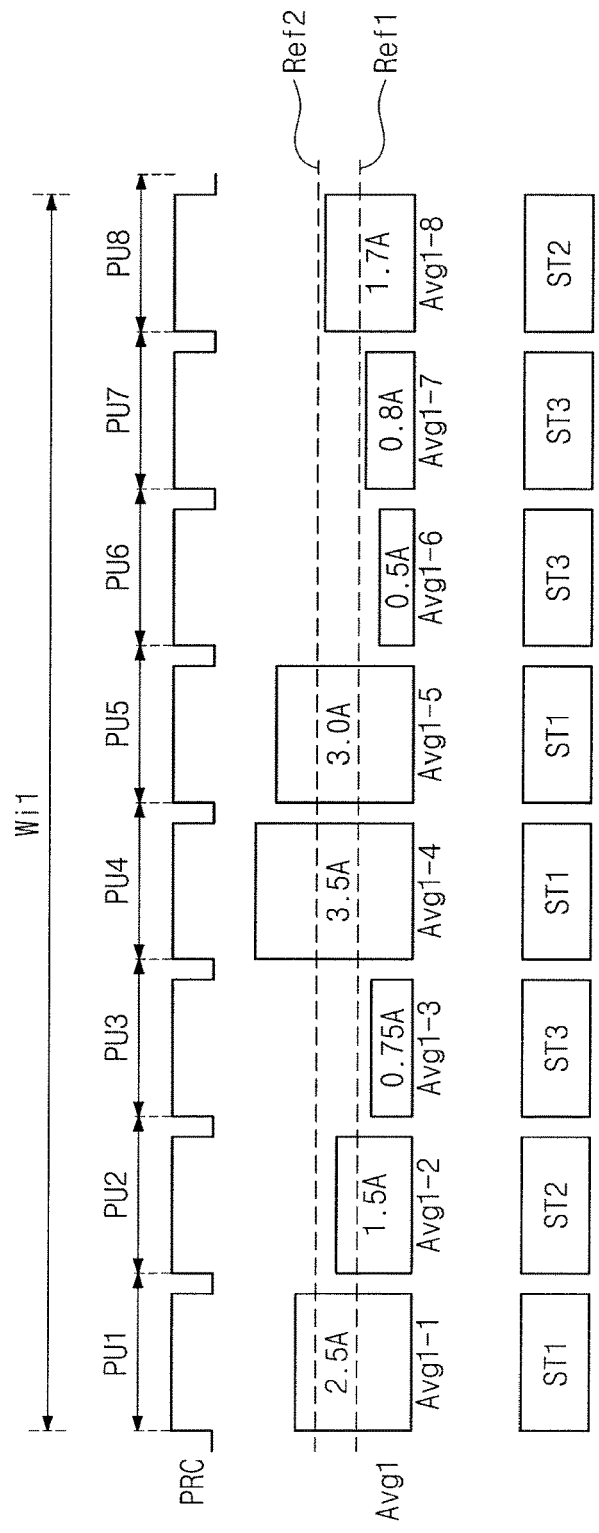
FIG. 5 illustrates an embodiment of a waveform diagram illustrating a cumulative number of first to third state signals during a window section.

FIG. 4 illustrates an embodiment of a first feedback current and a second feedback current during a unit section. FIG. 5 illustrates an embodiment of the cumulated numbers of first to third state signals during a window section.

Referring to FIG. 4, the unit section PU may be defined by a prediction signal PRC supplied to the controller 200. A section corresponding to one period of the prediction signal PRC may be defined as the unit section PU. The unit section PU includes an active section AP corresponding to a high section of the prediction signal PRC and a blank section BP corresponding to a low section of the prediction signal PRC.

As one example, the controller 200 divides the active section AP of the prediction signal PRC into m+1 sub sections P0 to Pm. The first sub section P0 of the m+1 sub sections P0 to Pm is set to a section of about 1 ms from the start point of the active section AP and is a preliminary section before calculating an average current. Each of the second sub section P1 to the m+1th sub section Pm, among the m+1 sub sections P0 to Pm, is a section where the controller 200 calculates the representative current of each of the first and second feedback currents FI1 and FI2.

In one embodiment, the controller 200 calculates the representative current PI1-1 based on the magnitude of the first feedback current FI1 during the second sub section P1. The controller 200 calculates the representative current PI1-2 based the magnitude of the first feedback current FI1 during the third sub section P2. Thus, the controller 200 calculates each of the m representative currents PI1-1 to PI1-$m$ based on the magnitude of the first feedback current FI1 during the m sub sections P1 to Pm.

The controller 200 calculates each of the m representative currents PI2-1 to PI2-$m$ based on the magnitude of the second feedback current FI2 during the m sub sections P1 to Pm. For example, each of the m representative currents PI1-1 to PI1-$m$ and PI2-1 to PI2-$m$ may be an average current value in each sub section or a maximum current value in each sub section.

The controller 200 calculates the first average current Avg1 based on the m representative currents PI1-1 to PI1-$m$ and calculates the second average current Avg2 based on the m representative currents PI2-1 to PI2-$m$.

Referring to FIGS. 2 and 5, the window section Wi1 includes eight unit sections (e.g., first to eighth unit sections PU1, PU2, PU3, PU4, PU5, PU6, PU7, and PU8). The first detection unit 211 of the controller 200 supplies the first average current Avg 1 to the comparison unit 220. For example, the first average current Avg1 includes first to eighth sub average currents Avg1-1, Avg1-2, Avg1-3, Avg1-4, Avg1-5, Avg1-6, Avg1-7, and Avg1-8 corresponding to first to eighth unit sections PU1 to PU8, respectively.

The comparison unit 220 compares a sub average current corresponding to each unit section with predetermined first and second reference currents Ref1 and Ref2. For example, the first reference current Ref1 is 2 A and the second reference current Ref2 is 1 A. The first sub average current Avg1-1 is 2.5 A, the second sub average current Avg1-2 is 1.5 A, the third sub average current Avg1-3 is 0.75 A, and the fourth sub average current Avg 1-4 is 3.5 A. Also, the fifth sub average current Avg 1-5 is 3.5 A, the sixth sub average current Avg 1-6 is 0.5 A, the seventh sub average current Avg 1-7 is 0.7 A, and the eighth sub average current Avg 1-8 is 1.7 A.

Since the first sub average current Avg1-1 is greater than the first and second reference currents Ref1 and Ref2, the comparison unit 220 outputs the first state signal ST1 as a result value of the first unit section PU1.

Since the second sub average current Avg1-2 is between the first and second reference currents Ref1 and Ref2, the comparison unit 220 outputs the second state signal ST2 as a result value of the second unit section PU2.

Since the third sub average current Avg1-3 is less than the first and second reference currents Ref1 and Ref2, the comparison unit 220 outputs the third state signal ST3 as a result value of the third unit section PU3.

Since the fourth and fifth sub average currents Avg1-4 and Avg1-5 are greater than the first and second reference currents Ref1 and Ref2, the comparison unit 220 outputs the first state signal ST1 as a result value of the fourth and fifth unit sections PU4 and PU5.

Since the sixth and seventh sub average currents Avg1-6 and Avg1-7 are less than the first and second reference currents Ref1 and Ref2, the comparison unit 220 outputs the third state signal ST3 as a result value of the sixth and seventh unit sections PU6 and PU7.

Since the eighth sub average current Avg1-8 is between the first and second reference currents Ref1 and Ref2, the comparison unit 220 outputs the second state signal ST2 as a result value of the eighth unit section PU8.

The cumulative number of the first status signals ST1 is 3, the cumulative number of the second status signals ST2 is 2, and the cumulative number of the third status signals ST3 is 3 during the window section Wi1. The on/off control unit 230 of the controller 200 may adjust the number of the operating power supply circuits based on the cumulative numbers of the first to third state signals ST1 to ST3. When the cumulative numbers of the first state signal ST1 and the third state signal ST3 are the same, a priority is assigned to the first state signal ST1. Accordingly, even when the cumulative numbers of the first state signal ST1 and third state signal ST3 are equal, on/off control unit 230 may determine to increase the number of operating power supply circuits.

Figure 6:
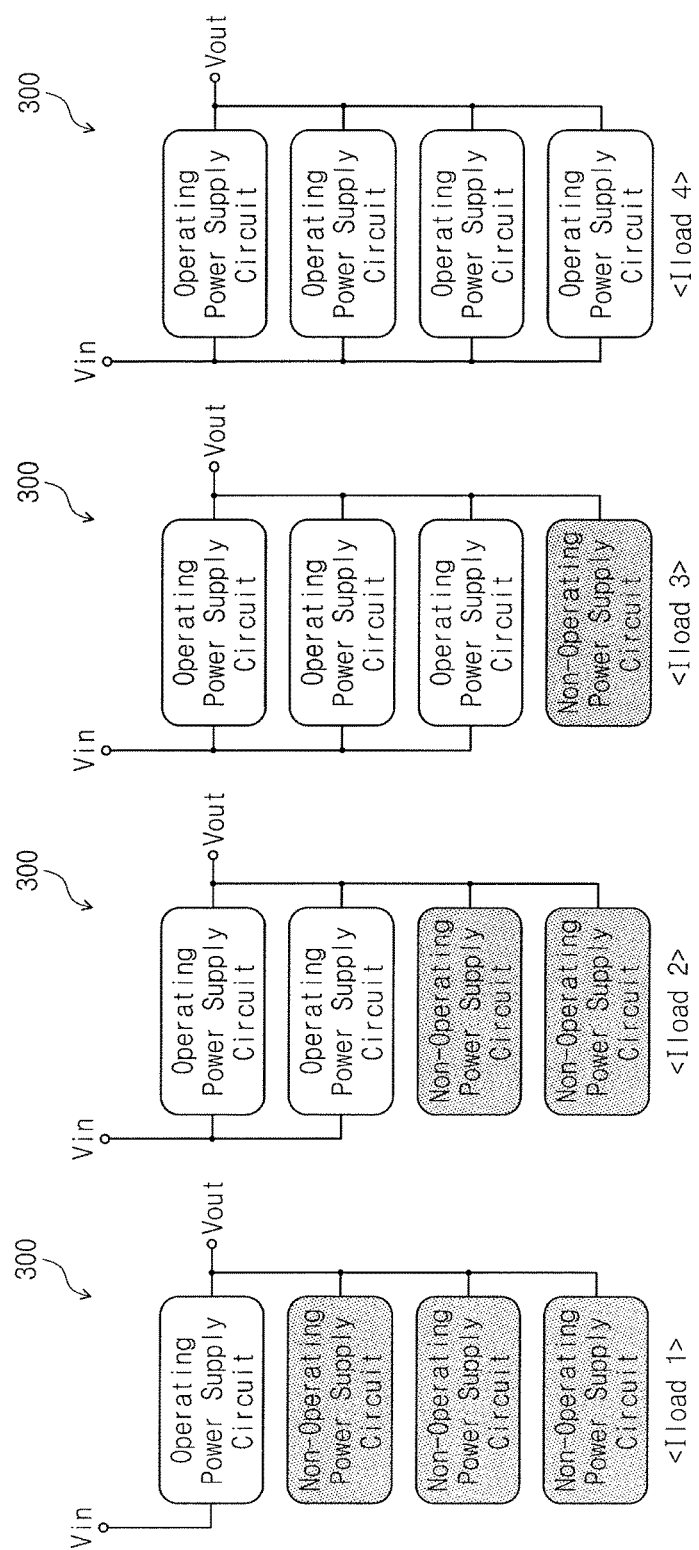
FIG. 6 illustrates an embodiment corresponding to a change in the number of operating power supply circuits.
Figure 7:
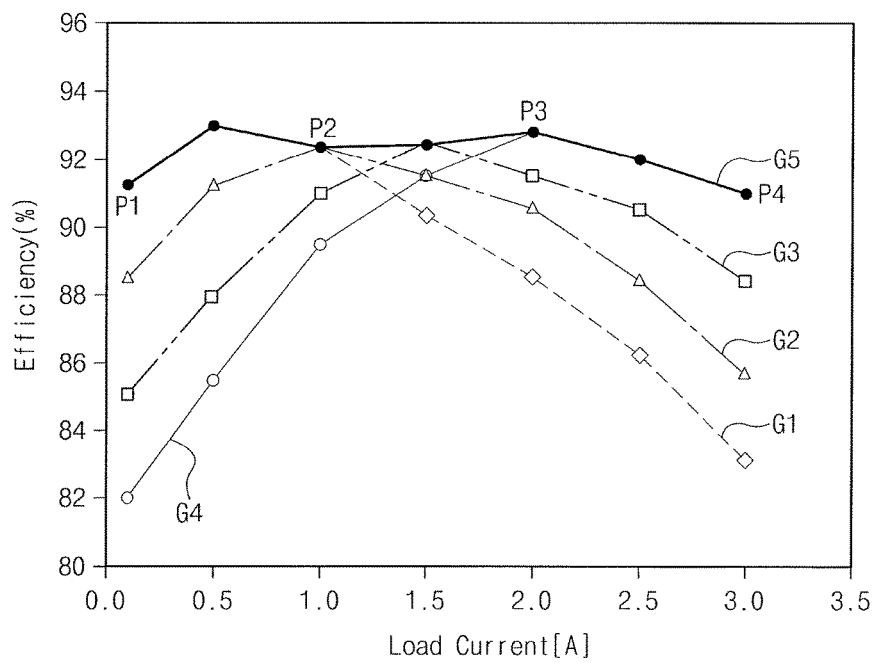
FIG. 7 illustrates an example of a graph illustrating efficiency of a power supply device according to the magnitude of a load current.

FIG. 6 illustrates an embodiment where the number of operating power supply circuits change. FIG. 7 illustrates an example of the efficiency of a power supply device according to the magnitude of a load current.

Referring to FIG. 6, the power supply 300 includes a plurality of power supply circuits connected in parallel to each other. The power supply circuits may be turned on/off based on the measured load current. The power supply device 300 may control, for example, the number of power supply circuits operating according to the load current. A power supply circuit that is in operation may be referred to as an operating power supply circuit, and a power supply circuit that is not in non-operation may be referred to as a non-operating power supply circuit.

The load current may be an average current of each window section described with reference to FIGS. 2 and 4. When the load current is less than a predetermined first load current Iload1, one of the power supply circuits is activated. When the load current is greater than the first load current Iload1 and less than a predetermined load current Iload2, one power supply circuit may be further operated.

In addition, when the load current is greater than the second reference current Iload2 and less than a predetermined third load current Iload3, three power supply circuits are activated. When the load current is greater than the third load current Iload3 and less than a predetermined fourth load current Iload4, all four power supply circuits may be operated.

Referring to FIG. 7, a first curve G1 shows efficiency according to the magnitude of the load current when only one of the four power supply circuits is operated. A second curve G2 shows efficiency according to the magnitude of the load current when two of the four power supply circuits are operated. A third curve G3 shows efficiency according to the magnitude of the load current when three of the four power supply circuits are operated. A fourth curve G4 shows efficiency according to the magnitude of the load current when all four power supply circuits are operated.

Referring to FIG. 7, when one operating power supply circuit among the four power supply circuits is provided, the highest efficiency is provided in a section where the magnitude of the load current is less than 1 A. When the load current is increased to 0.5 A or more, efficiency is reduced. When two operating power supply circuits among the four power supply circuits are provided, efficiency is reduced when the magnitude of the load current increases to more than 1 A. Thus, the magnitude of a critical load current where efficiency starts to be reduced is proportional to the number of operating power supply circuits, but efficiency is reduced in a low load current section.

Therefore, when the number of operating power supply circuits is adjusted according to the magnitude of the load current, the power supply device 300 may have a high efficiency in a wider load current section.

For example, as shown in the fifth curve G5, the power supply device 300 operates as one operating power supply circuit between the first point P1 and the second point P2, operates as two operating power supply circuits between the second point P2 and the third point P3, operates as three operating power supply circuits between the third point P3 and the fourth point P4, and operates as four operating power supply circuits from the fourth point P4. When the number of operating power supply circuits is changed according to the magnitude of a load in such a manner, efficiency is improved compared to another structure having a fixed number of operating power supply circuits.

Figure 8:
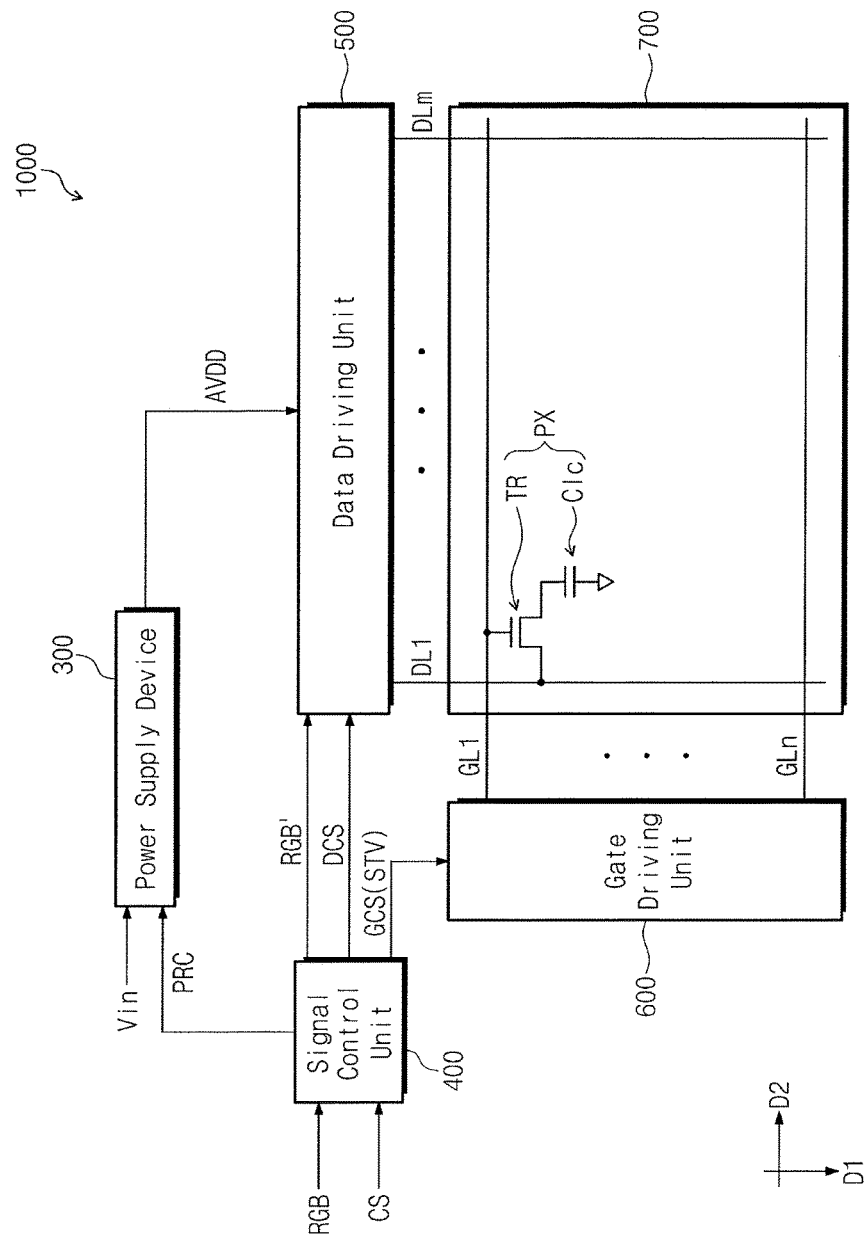
FIG. 8 illustrates an embodiment of a display device.
Figure 9:
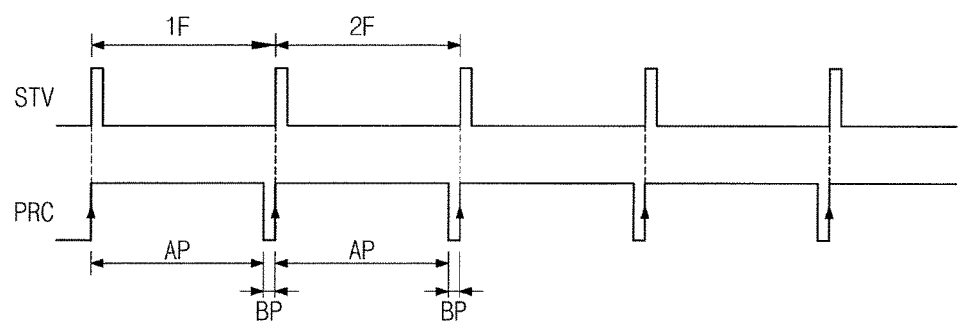
FIG. 9 illustrates a waveform diagram illustrating a vertical start signal and a prediction signal according to one embodiment.

FIG. 8 illustrates an embodiment of a display device 1000, and FIG. 9 is a waveform diagram illustrating an embodiment of a vertical start signal and a prediction signal in FIG. 8.

Referring to FIG. 8, the display device 1000 includes a display panel 700, a signal control unit 400, a data driving unit 500, a gate driving unit 600, and a power supply device 300. The display panel 700 includes a plurality of data lines DL1 to DLm, a plurality of gate lines GL1 to GLn, and a plurality of pixels PX. The data lines DL1 to DLm extend in a first direction D1 and the gate lines GL1 to GLn extend in a second direction D2 intersecting the first direction D1. The pixels PX are connected to the data lines DL1 to DLm and the gate lines GL1 to GLn.

Each of the pixels PX may be defined as a unit by which image information is displayed. In one embodiment, each pixel PX includes a thin film transistor TR connected to a liquid crystal capacitance Clc. Each of the pixels PX may further include a storage capacitance connected in parallel to the liquid crystal capacitance Clc.

The display panel 700 may further include a color filter to allow each of the plurality of pixels PX to have, for example, one of red, green, blue, and white colors.

The signal control unit 400 receives input image data RGB and an image control signal CS from an external image board. The input image data RGB may be defined as an image data signal input from an external source of the display device 1000 to the display device 1000.

The signal control unit 400 generates a gate control signal GCS and a data control signal DCS based on the image control signal CS and converts the format of the input image data RGB to generate converted image data RGB'. The gate driving unit 600 receives the gate control signal GCS from the signal control unit 400 and generates and outputs a gate signal based on the gate control signal GCS to the display panel 700. The data driving circuit 500 receives the converted image data RGB' and the data control signal DCS from the signal control unit 400, and converts the converted image data RGB' to a data signal based on the data control signal DCS to output the data signal to the display panel 700.

The gate lines GL1 to GLn of the display panel 700 is connected to the gate driving unit 600 and receives the gate signal. The data lines DL1 to DLm receive data signals from the data driving unit 500. Each pixel PX in the display panel 700 is connected to a corresponding one of the gate lines GL1 to GLn and a corresponding one of the data lines DL1 to DLm. Accordingly, each pixel PX may display an image by the gate and data signals.

As one example, the gate control signal GCS includes a vertical start signal STV for starting an operation of the gate driving unit 600. The signal control unit 400 generates the prediction signal PRC based on the vertical start signal STV and supplies the generated prediction signal PRC to the power supply device 300.

Referring to FIG. 9, one period of the vertical start signal STV corresponds to one frame section 1F and 2F where the display panel 700 displays an image. At the time point when the vertical start signal STV is generated in a high state, the frame section 1F and 2F may start.

One period of the prediction signal PRC also corresponds to the one frame section 1F and 2F. At the rising time point of the vertical start signal STV, the prediction signal PRC is switched to a high state. The prediction signal PRC includes an active section AP and a blank section BP. The active section AP is an operation section in which the data signal is supplied to the display panel 700 and the blank section BP is a non-operation section in which the data signal is not supplied to the display panel 700.

The power supply 300 receives an input voltage Vin from an external source and boosts the input voltage Vin to output an analog driving voltage AVDD. The analog driving voltage AVDD is supplied to the data driving unit 500 and used when the data driver 500 is driven. For example, the power supply device 300 receives the prediction signal PRC from the signal control unit 400 to adjust the number of operating power supply circuits according to the magnitude of a load current detected through the detection units (e.g., see FIG. 2). The power supply device 300 may have, for example, the same configuration as in FIG. 1.

Figure 10:
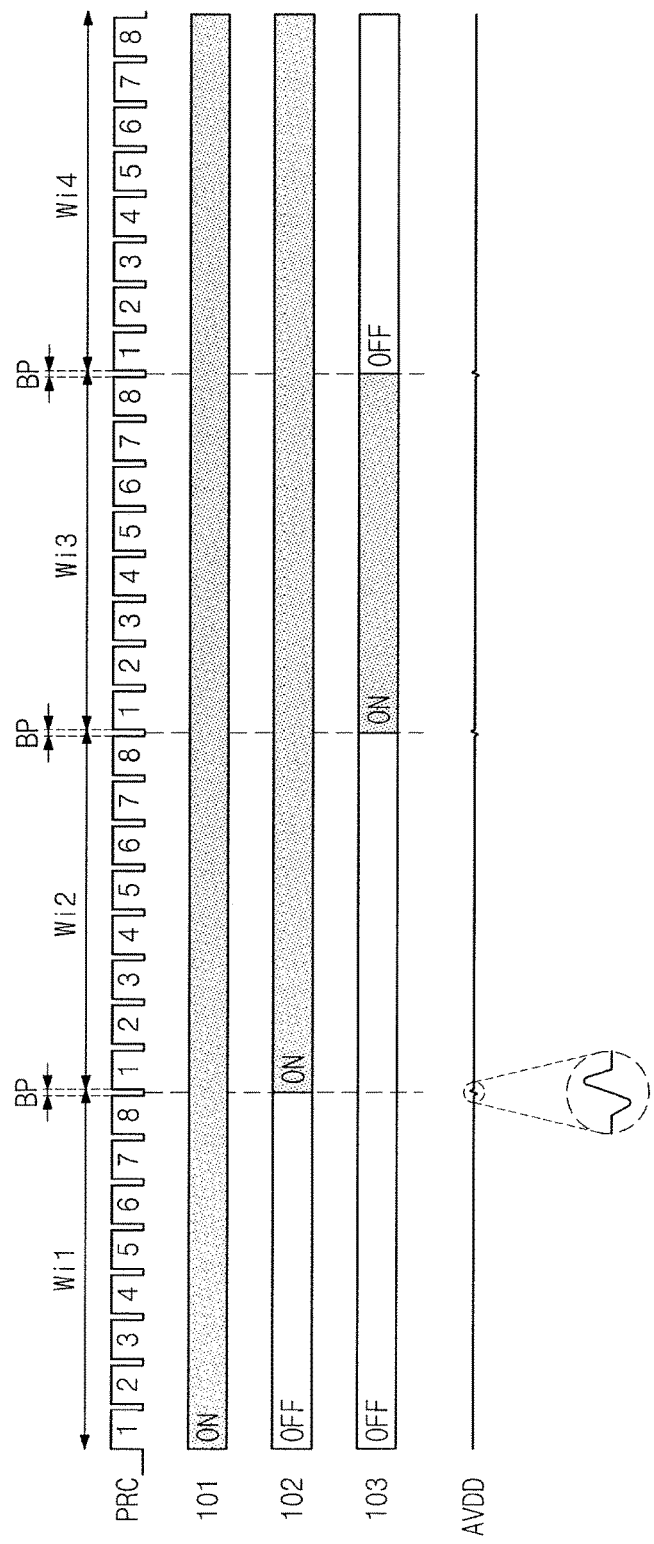
FIG. 10 illustrates a waveform diagram illustrating the on/off time point of a power supply circuit in a power supply device according to one embodiment.

FIG. 10 is a waveform diagram embodiment of the on/off time point of a power supply circuit in a power supply device. Four consecutive window sections (first to fourth window sections Wi1, Wi2, Wi3, and Wi4) are shown in FIG. 10. The number of consecutive window sections may be different in another embodiment.

Referring to FIG. 10, each of the first to fourth window sections Wi1, Wi2, Wi3, and Wi4 has a length corresponding to the eight periods of a prediction signal PRC. The length of each of the window sections Wi1, Wi2, Wi3, and Wi4 may be different in another embodiment.

The first power supply circuit 101 operates (ON) and the second and third power supply circuits 102 and 103 stop their operations (OFF) during the first window section Wi1. Then, the first and second power supply circuits 101 and 102 operate (ON) and the third power supply circuit 103 maintains the non-operation state (OFF) during the second window section Wi2. The time point (ON) when the second power supply circuit 102 operates may be located in the last blank section BP of the prediction signal PRC in the first window section Wi1.

As shown in FIG. 10, when the driving states of the power supply circuits 101, 102, and 103 are changed, a ripple may occur from the analog driving voltage AVDD at the time point of the change. However, when the driving states of the power supply circuits 101, 102, and 103 are changed in the blank section, a ripple occurring from the analog driving voltage AVDD occurs in the black section BP. Since the blank section BP is a section where the data driver 500 does not substantially operate, the ripple may not affect operation of the display panel 700.

Figure 11:
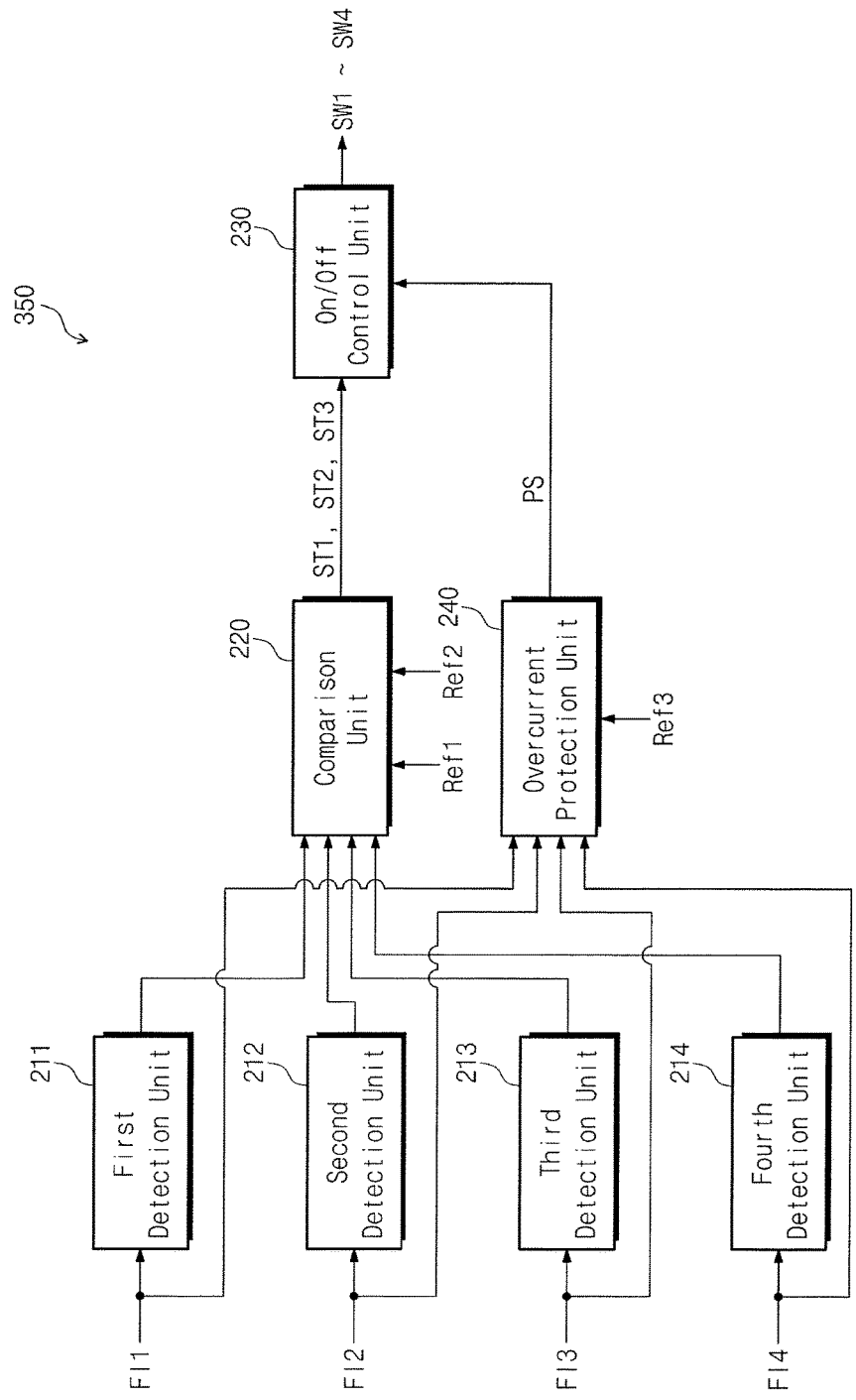
FIG. 11 illustrates another embodiment of a power supply device.
Figure 12:
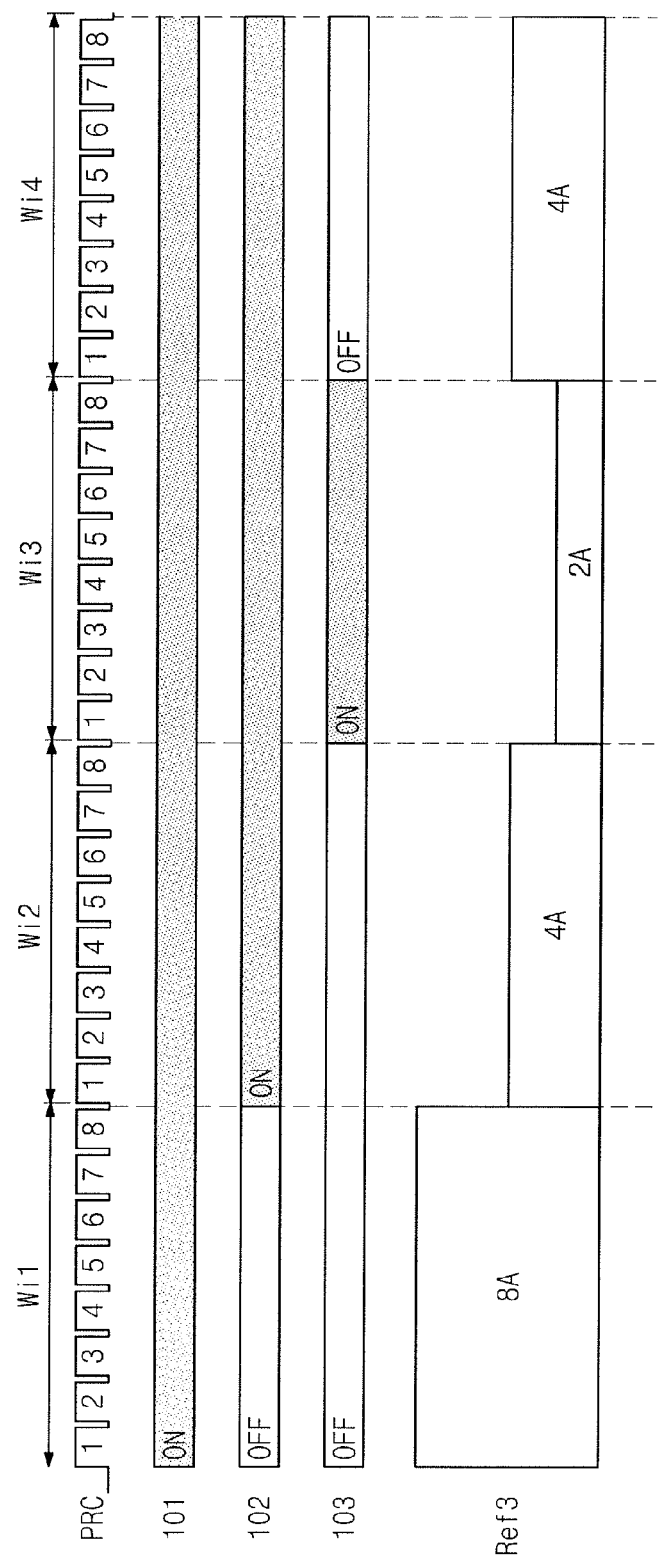
FIG. 12 illustrates an embodiment of a waveform diagram illustrating the magnitude of a third reference current varying based on the number of operating power supply circuits.

FIG. 11 illustrates an embodiment of a power supply device 350, and FIG. 12 illustrates an embodiment of the magnitude of a third reference current varying according to the number of operating power supply circuits.

Referring to FIG. 11, the power supply device 350 further includes an overcurrent protection unit 240. The overcurrent protection unit 240 receives first to fourth feedback currents FI1, FI2, FI3, and FI4 fed back from the first to fourth power supply circuits 101, 102, 103, and 104 in FIG. 1. The current fed back to the overcurrent protection unit 240 is not limited to four, but the number may vary depending on the number of operating power supply circuits. For example, when only the first power supply circuit 101 is activated, only the first feedback current FI1 is input to the overcurrent protection unit 240. Thus, when only the first power supply circuit 101 among the first to fourth power supply circuits 101 to 104 is activated, only the first feedback current FI1 is input to the overcurrent protection unit 240.

The overcurrent protection unit 240 compares the feedback currents supplied from the operating power supply circuits with a predetermined third reference current Ref3 to determine whether overcurrent occurs. When it is determined that an overcurrent occurs, the overcurrent protection unit 240 transmits a protection signal PS to the on/off control unit 230 to allow a currently operating power supply circuit to stop its operation.

As one example, the third reference current Ref3 may not be a fixed value but may be a value that varies based on the number of the operating power supply circuits.

As shown in FIG. 12, when only the first power supply circuit 101 operates and the second and third power source circuits 102 and 103 do not operate as in the first window period Wi1, the third reference current Ref3 may be set to about 8 A. In this case, the overcurrent protection unit 240 compares the first feedback current FI1 fed back from the first power supply circuit 101 with the third reference current Ref3 having a magnitude of 8 A. When the first feedback current FI1 is greater than about 8 A, the overcurrent protection unit 240 recognizes it as overcurrent and transmits the protection signal PS to the on/off control unit 230 in order to allow the first power supply circuit 101 to stop operation.

The third reference current Ref3 may have a magnitude of 4 A during the second window section Wi2 during which the first and second power supply circuits 101 and 102 operate. The third reference current Ref3 may have a magnitude of 2 A during the third window section Wi2 during which the first to third reference currents 101, 102, and 103 operate.

When each of the first and second feedback currents FI1 and FI2 fed back to the overcurrent protection unit 240 is greater than the third reference current Ref3 having a magnitude of 4 A during the second window section Wi2, it is recognized as overcurrent. When each of the first to third feedback currents FI1 to FI3 fed back to the overcurrent protection unit 240 is greater than the third reference current Ref3 having a magnitude of 2 A during the third window section Wi3, it is recognized as overcurrent.

As one example, a period during which the overcurrent protection unit 240 compares the third reference current Ref3 with the feedback currents FI1 to FI4 may be shorter than one period of the prediction signal PRC. For example, when the period of the prediction signal PRC is 10 ms, the operation period of the overcurrent protection unit 240 may be 3 ms.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing the methods described herein.

The controllers, detection units, comparison units, control units, drivers, and other processing features of the disclosed embodiments may be implemented in logic which, for example, may include hardware, software, or both. When implemented at least partially in hardware, the controllers, detection units, comparison units, control units, drivers, and other processing features may be, for example, any one of a variety of integrated circuits including but not limited to an application-specific integrated circuit, a field-programmable gate array, a combination of logic gates, a system-on-chip, a microprocessor, or another type of processing or control circuit.

When implemented in at least partially in software, the controllers, detection units, comparison units, control units, drivers, and other processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

In accordance with one or more of the aforementioned embodiments, a power supply device includes a plurality of power supply circuits connected in parallel. The power supply device adjusts the number of operating power supply circuits according to the magnitude of a load current, by feeding back current from an operating power supply circuit among the plurality of power supply circuits. Thus, even when the magnitude of a load current changes, efficiency of a power supply device may not be reduced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A power supply device, comprising:
    n power supply circuits connected in parallel, where n is a natural number of 2 or more; and
    a controller configured to control a number of operating power supply circuits among the n power supply circuits, wherein the controller includes:
    n detectors respectively connected to the n power supply circuits, the n detectors are configured to receive a feedback current from the number of operating power supply circuits among the n power supply circuits;
    a comparator configured to compare the feedback current with predetermined first and second reference currents and output first, second, and third state signals; and
    an on/off controller configured to determine the number of the operating power supply circuits according to a cumulative number of each of the first to third state signals during a predetermined window section and to control on/off of the power supply circuits according to the determined number, wherein:
    the window section includes a plurality of unit sections,
    each of the n detectors is configured to calculate an average current of each of the plurality of unit sections based on the feedback current,
    the comparator is configured to output the first state signal when the average current of each of the plurality of unit sections is greater than the first and second reference currents,
    the comparator is configured to output the second state signal when the average current of each of the plurality of unit sections is between the first and second reference currents, and
    the comparator is configured output the third state signal when the average current of each of the plurality of unit sections is less than the first and second reference currents.

2. The power supply device as claimed in claim 1, wherein:
    each of the n detectors is configured to receive the feedback current from a corresponding power supply circuit, during a high section of a switching signal, to control operation of the corresponding power supply circuit.

3. The power supply device as claimed in claim 1, wherein:

when the number of the first state signals accumulated during the window section is largest, the number of the operating power supply circuits is increased;

when the number of the second state signals accumulated during the window section is largest, the number of the operating power supply circuits is not changed; and when the number of the third state signals accumulated during the window section is largest, the number of the operating power supply circuits is decreased.

4. The power supply device as claimed in claim 1, wherein:

when the cumulative numbers of at least two signals of the first to third state signals are equal, priority is to be given in an order of the first, second, and third state signals.

5. The power supply device as claimed in claim 2, wherein the controller includes an overcurrent protector to compare the feedback current to a predetermined third reference current and to turn off the operating power supply circuit when the feedback current is greater than the third reference current.

6. The power supply device as claimed in claim 5, wherein a magnitude of the third reference current is to be set according to the number of the operating power supply circuits.

7. The power supply device as claimed in claim 5, wherein an operation period of the overcurrent protector is shorter than the unit section.

8. A display device, comprising:

a display panel to display an image;

a driver to drive the display panel; and a power supply to supply a driving voltage to the driver, wherein the power supply includes:

n power supply circuits connected in parallel, where n is a natural number of 2 or more, and a controller configured to control a number of operating power supply circuits among the n power supply circuits, wherein the controller includes:

n detectors respectively connected to the n power supply circuits, the n detectors are configured to receive a feedback current from the number of operating power supply circuits among the n power supply circuits;

a comparator configured to compare the feedback current with predetermined first and second reference currents to output first, second, and third state signals; and an on/off controller configured to determine the number of the operating power supply circuits according to the cumulative number of each of the first to third state signals during a predetermined window section and to control an on/off of the power supply circuits according to the determined number, wherein:

the window section includes a plurality of unit sections, each of the n detectors is configured to calculate an average current of each of the plurality of unit sections based on the feedback current, the comparator is configured to output the first state signal when the average current of each of the plurality of unit sections is greater than the first and second reference currents, the comparator is configured to output the second state signal when the average current of each of the plurality of unit sections is between the first and second reference currents, and the comparator is configured to output the third state signal when the average current of each of the plurality of unit sections is less than the first and second reference currents.

9. The display device as claimed in claim 8, wherein:

each of the n detectors is configured to receive the feedback current from a corresponding power supply circuit, during a high section of a switching signal, to control operation of the corresponding power supply circuit.

10. The display device as claimed in claim 9, wherein each of the plurality of unit sections corresponds to one frame section where the display panel displays an image.

11. The display device as claimed in claim 10, wherein the driver includes:

a data driver to supply a data signal to the display panel;

a gate driver to supply a gate signal to the display panel; and a signal control unit is to generate a prediction signal to set the unit section based on a vertical start signal to start operation of the gate driver.

12. The display device as claimed in claim 11, wherein:

the prediction signal includes an active section where the data driver is to operate and a blank section where the data driver is not to operate; and the on/off controller is to change an on/off state of the power supply circuits during the blank section.

13. The display device as claimed in claim 8, wherein:

when a number of the first state signals accumulated during the window section is largest, the number of the operating power supply circuits is increased;

when a number of the second state signals accumulated during the window section is largest, the number of the operating power supply circuits is not changed; and when a number of the third state signals accumulated during the window section is the largest, the number of the operating power supply circuits is decreased.

14. The display device as claimed in claim 8, wherein:

when the cumulative numbers of at least two signals of the first to third state signals are equal, priority is to be given in an order of the first, second, and third state signals.

15. The display device as claimed in claim 8, wherein the controller includes an overcurrent protector to compare the feedback current with a predetermined third reference current and to turn off the operating power supply circuit when the feedback current is greater than the third reference current.

16. The display device as claimed in claim 15, wherein a magnitude of the third reference current is set according to the number of the operating power supply circuits.

* * * * *